(12) United States Patent
Tulchinsky et al.

(10) Patent No.: US 8,234,348 B1
(45) Date of Patent: Jul. 31, 2012

(54) DETERMINING IF AN APPLICATION IS CACHED

(75) Inventors: Ilia Tulchinsky, Maple, CA (US); Derek J. Phillips, Waterloo, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/251,085

(22) Filed: Sep. 30, 2011

Related U.S. Application Data

(63) Continuation of application No. 12/895,257, filed on Sep. 30, 2010.

(51) Int. Cl.
G06F 15/16 (2006.01)
(52) U.S. Cl. .................. 709/214; 709/219; 709/245
(58) Field of Classification Search .............. 709/214, 709/219, 245
See application file for complete search history.

(56) References Cited

U.S. PATENT DOCUMENTS

| | | | | |
|---|---|---|---|---|
| 6,237,060 B1* | 5/2001 | Shilts et al. | | 709/227 |
| 6,457,047 B1* | 9/2002 | Chandra et al. | | 709/217 |
| 6,560,635 B1* | 5/2003 | Lea et al. | | 709/203 |
| 6,941,351 B2* | 9/2005 | Vetrivelkumaran et al. | | 709/217 |
| 7,082,476 B1* | 7/2006 | Cohen et al. | | 709/246 |
| 7,624,160 B2* | 11/2009 | Henderson et al. | | 709/219 |
| 7,774,740 B2* | 8/2010 | Balassanian | | 717/100 |
| 7,778,987 B2* | 8/2010 | Hawkins | | 707/705 |
| 7,814,234 B2* | 10/2010 | Hawkins et al. | | 709/250 |
| 2005/0033767 A1* | 2/2005 | Kamentz et al. | | 707/104.1 |
| 2010/0138485 A1* | 6/2010 | Chow et al. | | 709/203 |
| 2010/0235321 A1* | 9/2010 | Shukla et al. | | 707/610 |
| 2010/0250649 A1* | 9/2010 | Larsson et al. | | 709/203 |

OTHER PUBLICATIONS

T. Berners-Lee et al., Request for Comments (RFC) 3986: Uniform Resource Identifier (URI) : Generic Synax, Network Working Group, Jan. 2005, pp. 1-62.*
David, Jean-Luc. "Cookieless Data Persistence is Possible." Builder.com [Retrieved on Sep. 30, 2010] Retrieved from the Internet <URL: http://www.builderau.com.au/webdev/scripting/soa/Cookieless-data-persistence-is-possibl . . . > (3 pages).
Google Code. "Making AJAX Application Crawlable." [Retrieved on Sep. 30, 2010] Retrieved from the Internet <URL: http://code.google.com/web/ajaxcrawling/docs/specification.html> (6 pages).
Wikipedia. "Fragment Identifier." [Retrieved on Jun. 10, 2010] Retrieved from the Internet <URL: http://en.wikipedia.org/w/index.php?title=Fragment_identifier&printable=yes> (4 pages).

* cited by examiner

*Primary Examiner* — Patrice Winder
(74) *Attorney, Agent, or Firm* — Fish & Richardson P.C.

(57) ABSTRACT

In general, the subject matter described in this specification can be embodied in methods, systems, and program products for determining if a web application is cached. A source web application that is executed by a web browser that is installed on a computing device determines that the web browser is to navigate to a target web application. The source web application determines whether resources for the target web application are cached at the computing device. The source web application performs actions to request resources for the target web application based on the determination whether resources for the target web application are cached, wherein the actions comprise requesting resources for the target web application using a first address if the target web application is determined to be cached and using a second address if the target web application is determined to not be cached.

29 Claims, 7 Drawing Sheets

DETERMINING IF AN APPLICATION IS CACHED

CROSS-REFERENCE TO RELATED APPLICATIONS

This application claim priority to U.S. application Ser. No. 12/895,257 filed on Sep. 30, 2010, the entire contents of which are hereby incorporated by reference.

TECHNICAL FIELD

This document generally describes techniques, methods, systems, and mechanisms for determining if a computer application is cached.

BACKGROUND

The present disclosure generally relates to computer web applications. Web applications are computer software applications that use a web browser as a client, potentially allowing a software application program to run on multiple different types of operating systems so long as the web application is being hosted in a browser-controlled environment. In other words, web applications may be reliant on a web browser to make the applications executable. A web browser includes program instructions for retrieving, presenting, and traversing information resources on the World Wide Web. A web browser may be an application that is invoked independently of an operating system, or may be integrated into an operating system.

Example web applications include certain company websites, webmail websites, online retail sales and auction websites, and social networking websites. Specific examples may include GMAIL, GOOGLE MAPS, and FACEBOOK. A web application may be a web page that has client-side scripting language.

As an example, a user of a computing device may access a particular web application by launching a web browser, typing into the web browser's address bar a Uniform Resource Locator (URL) address for a web page whose rendering causes execution of a web application, and selecting an "enter" key on the user's keyboard. The web browser may send a Hypertext Transfer Protocol (HTTP) request over the internet for resources that correspond to the URL.

In response to the HTTP request, the web browser may receive from a server system a set of resources that the server system identified as relevant for the URL (e.g., HTML for a web page, a CSS document, and a JavaScript file). The web browser may execute the resources, for example, by rendering a parent HTML file and executing other resources referenced therein. The execution of the resources may cause the web browser to effectively "display" the web application on a display device.

The web browser can cache the resources for the URL in a local application cache, with the resources keyed to the URL. Upon the web browser receiving a subsequent request to navigate to the URL, the web browser may determine if resources for the URL are stored in the application cache. If so, the web browser may retrieve the resources from the application cache instead of requesting the resources over the network with an HTTP request. The local caching of application resources may increase the responsiveness of an application program, for example, because the latencies inherent in a network can be avoided. Additionally, a local cache of application resources can allow the application program to be available for execution even when the computing device is not connected to a network.

An executing set of resources for a web application may provide multiple different displayed "views" of the web application. Each view may be provided by execution of a set of resources that are associated with a single URL. Each view, however, may be specified by a "hash fragment" in the URL address (e.g., a portion of the address that follows a hash (#) symbol). The hash symbol may provide for solely client-side navigation between different states of a web application. For example, application cache keys may not include hash fragments for the URLs (e.g., because the application cache may ignore hash fragments when generating an application cache key). Thus, a single set of resources that may provide for many different views may be cached under a single URL that does not include a hash value. Similarly, the web browser may not include hash values in HTTP network requests, even when a web page or application program requests that the web browser navigate to a URL that includes a hash value.

As an illustration, a user of a computing device may launch a webmail application program by opening a web browser and navigating to the URL www.webmail.com/app. When a user selects a "Compose Email" graphical interface element, the web browser may display the present address as www-.webmail.com/app#compose. Conversely, when an email inbox is displayed, the web browser may display the present address as www.webmail.com/app#inbox. The instructions for serving both the "Compose Email" display and the "Inbox" display may be provided from a single set of resources.

SUMMARY

This document describes techniques, methods, systems, and mechanisms for determining if an application is cached (i.e., if resources for the application are stored locally on a computing device so that the application can be operated with those resources, without access to a remote server system). In general, instead of a source application program directly navigating to an address for a target application program, the source application program can determine if the address for the target application program includes a query fragment behind a hash (#) value. If so, the source application program can first check to see if resources for the target application are locally cached. If the resources are locally cached, the source application program can navigate to the target application normally.

If the resources are not locally cached, the source application program can modify the address before requesting the resources. The modification may include converting the fragment to a parameter (e.g., a portion of the address that follows a question mark (?)). Multiple parameters may be separated by an ampersand symbol (&). Thus, when the web browser receives the request that includes the modified address, the web browser forwards the request with the modified address over a network to a server system.

The information in the fragment is not lost in the network request because the fragment has been converted to a parameter (to the contrary, the web browser may drop a fragment that is in a similar request). Thus, if multiple redirects occur, as may occur with a login process, the server system can pass the parameter with the redirect requests so that the web browser eventually receives the parameter. Thus, when resources are retrieved for the web application, the web application can access information that identifies a state of the application to launch.

In general, one aspect of the subject matter described in this specification can be embodied in a computer-readable storage medium storing instructions that, when executed by one or more processing devices, perform operations for determining if a web application is cached. The operations include determining, by a source web application that is executed by a web browser that is installed on a computing device, that the web browser is to navigate to a target web application. The operations include determining, by the source web application, whether resources for the target web application are cached at the computing device. The operations include performing actions to request resources for the target web application based on the determination whether resources for the target web application are cached. The actions include requesting resources for the target web application using a first address if the target web application is determined to be cached and using a second address if the target web application is determined to not be cached.

This and other additional aspects can optionally include one or more of the following features. Determining that the web browser is to navigate to the target web application may include receiving, prior to the determining whether resources are cached, an indication that the web browser is to navigate to the first address. Determining that the web browser is to navigate to the target web application may include deciding, prior to the determining whether resources are cached, that the first address includes a hash fragment. The determining may be performed in response to deciding that the first address includes a hash fragment. The web browser may be configured to not send the query fragment in a Hypertext Transfer Protocol (HTTP) request for resources that correspond to the first address.

Determining whether resources for the target web application are cached and performing actions to request resources for the target web application may be performed by web browser execution of a scripting language. The scripting language may be included in resources that the computing device received from a server system. The resources may have been received in response to a request to retrieve resources for an address that corresponds to the source web application. Determining whether resources for the target web application are cached may include requesting resources for a third address that is different than the first and second addresses. Determining whether resources for the target web application are cached may include before requesting resources for the third address, setting a value that is stored at the computing device. Determining that the web browser is to navigate to the target web application may include after receiving a response to the request for resources for third address, determining whether the value has changed.

Determining whether the value has changed may include determining whether the value has changed in a predetermined manner. A determination that the value has changed in the predetermined manner may cause a determination that resources for the target web application are not cached. A determination that the value has not changed in the predetermined manner may cause a determination that resources for the target web application are cached. The determination that the value has changed in the predetermined manner may indicate to the source web application that a server system (i) received the request for resources for the third address and (ii) changed the value in the predetermined manner. The determination that the value has not changed in the predetermined manner may indicate to the source web application: (i) that a cache at the computing device received the request for resources for the third address, (ii) that the cache did not change the value, and (iii) that the web browser did not send a request for resources for the third address over a network and to a server system.

The address may include a location portion and a fragment portion. The first address may be assembled such that the web browser receiving a request to navigate to the first address may be configured to request resources for the first address by transmitting the location portion, but not the fragment portion, over a network and to a server system. The first address may be assembled to separate the fragment portion from the location portion by a hash (#) symbol. The second address may include a location portion and a parameter portion. The second address may be assembled such that the web browser receiving a request to navigate to the second address may be configured to request resources for the second address by transmitting the location portion and the parameter portion over a network and to a server system.

The second address may be assembled to separate the location portion from the parameter portion by a question mark (?) symbol. A content of the parameter portion may include a content of the fragment portion. The operations may include accessing, in response to performing actions to request resources for the target web application, resources that are for the target application from a cache at the computing device and that are stored for a cache key that includes the first address location portion, but does not include the first address fragment portion. Accessing resources that are from the cache may cause the web browser to execute the resources and launch the target web application. The operations may include invoking a state of the target web application that is defined by the first address fragment portion. The indication that the web browser is to navigate to the target application may include an indication that the web browser is to navigate to the first address. The state of the target web application that is defined by the fragment portion may be invoked both (i) in response to a request for resources for the target web application using the first address and by the source application, and (ii) in response to a request for resources for the target web application using the second address and by the source application.

Another aspect of the subject matter described in this specification can be embodied in a computer-readable storage medium storing instructions that, when executed by one or more processing devices, perform operations for determining if a web application is cached. The operations include determining, by a source web application that is executed by a web browser that is installed on a computing device, that the web browser is to navigate to a first address, the first address including a location portion and a fragment portion. The first address is assembled such that the web browser, in response to receiving a request to navigate to the first address, is configured to request resources for the first address by transmitting the location portion, but not the fragment portion, over a network and to a server system. The operations include determining, by the source web application, whether resources for the target web application are cached at the computing device by: (i) setting a value that is stored at the computing device, (ii) requesting resources for a third address, the third address being different than the first address and a second address, and (iii) determining if the value has changed in response to requesting the resources for the third address. The operations include performing actions to request resources for the target web application based on the determination whether resources for the target web application are cached. The actions include requesting resources for the target web application using the first address if the target web application is determined to be cached, and using the second address if the target web application is determined to not be cached. The second address includes a location portion and a parameter portion. The second address is assembled such that the web browser, in response to receiving a request to navigate to the second address, is configured to request resources for the second address by transmitting the location portion and the parameter portion over a network and to a server system.

In yet another aspect, the subject matter described in this specification can be embodied in a system for determining if a web application is cached. The system includes an application cache, at a computing device, that is accessible to a web browser. The application cache stores resources that are keyed to addresses. The resources are loaded into the cache in response to the web browser receiving resources that are responsive to requests over a network. The requests are to retrieve resources for addresses that correspond to the resources. The system includes a source web application program, at the computing device, that is programmed to: (i) identify that the web browser is to navigate to a particular address for a target web application, (ii) determine whether resources for the target web application are stored in the application cache, and (iii) request resources for the target web application using a first address when the target web application is determined to be cached and a second address when the target web application is determined to not be cached.

This and other additional aspects can optionally include one or more of the following features. The source web application program may determine whether the resources for the target web application are stored in the application cache by: (i) setting a cookie value at the computing device; (ii) requesting data for another address; and (iii) determining if the cookie value has changed in a predetermined manner. The first address may include a location portion and a hash fragment portion. The second address may include a location portion and a parameter portion. A content of the parameter portion may include a content of the hash fragment portion.

Particular embodiments can be implemented, in certain instances, to realize one or more of the following advantages. A source web application may request navigation to a particular view of a target web application, causing the particular view of the target web application to display regardless whether the resources for the target web application were cached or retrieved from a server system. The particular view may be displayed even when the server system requests multiple redirects. Thus, the full benefits of an application cache can be utilized to navigate between web applications, increasing the speed that a target web application may be presented for display.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
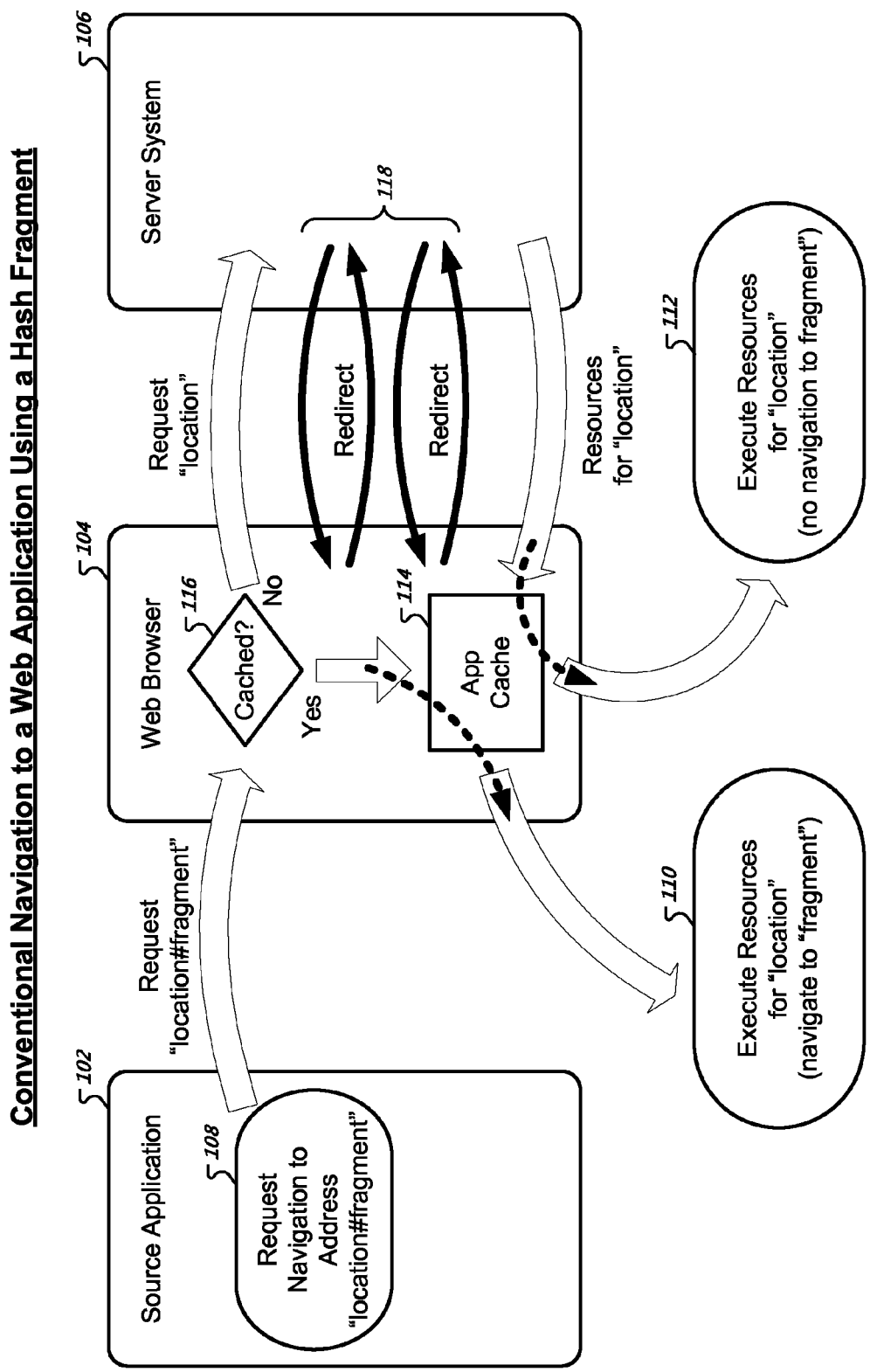
FIG. 1 is a conceptual diagram illustrating conventional navigation to a web application using a hash fragment.

This document generally describes mechanisms for determining whether an application is cached. Web applications use resources that may be stored in an HTML5 application cache from which the application starts when a user navigates to the application's URL. The cache may be keyed on a full URL, including path and query parameters. A change in the URL, however, may "defeat" the application cache and may cause a round trip to the server (and storage of the retrieved resources under a different key in the application cache).

Thus, a web application may manage navigation by using the "hash" fragment of the URL (e.g., http://a.b.c?q=x#thisishash). Changing the hash fragment may not cause a roundtrip to the server, and the hash fragment may be ignored when generating the application cache key, so that no matter what the hash fragment is in the URL, the application may be loaded from the application cache entry for a base portion of the URL. Thus, web applications may use hash fragments to denote different portions of the application to which a user may navigate (e.g., http://a.b.c.#inbox, http://a.b.c.#compose).

In some examples, a source web application may navigate to a portion of a target application. As an illustration, the source application may be served from http://src.x.y and the target application may be served from http://tgt.x.y, with the desired portion for navigation being http://tgt.x.y#screen1. Thus, a field for a current URL may include http://tgt.x.y#screen1. If the resources for the target application have not been cached, the web browser may request the resource for http://tgt.x.y over a network. Should the request involve multiple redirects (e.g., as occurring during a login process), the web browser may replace the URL with the hash fragment that is in the current URL field with another URL. Thus, upon the web browser being served resources for the target application, the web browser may have "forgotten" the screen of the application to which the web browser was to navigate. Further, the server system providing the resources may never have received the hash fragment that identifies the desired portion for navigation, and thus cannot inform the web browser of the portion that the web browser should navigate to.

Accordingly, to ensure that the target application navigates to the desired portion, the source application may first check to see if the target application is application cached. If so, the source application may request the target application as normal (e.g., with the hashed fragment). If the target application is not cached, however, the source application may request a different URL. For example, the source application may change the content in the hashed fragment to a query parameter (which is sent to the server system in a request). The server system may retain the query parameter as a portion of the redirected URLs, allowing a recovery of the content in the original hashed fragment in a final redirect.

The source application may check to see if the target application is application cached by setting a cookie (e.g., a CHECK_APPCACHE cookie) that is on the target application's address to a random value. The source application may submit an XML Http Request (XHR) to a variation of the address for the target application (e.g., the address http://tgt.x.y/checkAppCache). The variation of the address may correspond to resources that are specified in a cache manifest for the target application. In other words, if the target application is application cached, resources may also be stored for the variation of the address due to the resource's identification in the cache manifest. The XHR request may allow the source web application to communicate with a server system and load the server response data directly back into a script that is executing for the source web application (e.g., allowing the source application to retain control after requesting data over a network).

After submitting the XHR request, the source application may check to see if the cookie has changed in a predictable way (e.g., if the value has been incremented by one). If the cookie has changed in the predictable way, the source application may know that the target application is not application cached, and may modify the address for the target application to convert the hash fragment to a query parameter. If the cookie has not changed in the predictable way, the source application may know that the target application is application cached, and may perform a normal request for resources for the target application (e.g., a request that includes the hash fragment).

The cookie value may change in the predictable way when the target application is not cached because the web browser may determine that corresponding resources are not cached, and may forward the XHR request to a server system. The server system may include server-side executable logic that requests a modification to the cookie.

On the other hand, resources for the address http://tgt.x.y/checkAppCache may sometimes be stored in the application cache under a corresponding key. The resources may be stored under the key when the checkAppCache resources are downloaded in response to an earlier request for http://tgt.x.y resources. The cached checkAppCache resources, however, may not include the server-side code that changes the cookie value. Thus, when a request to http://tgt.x.y.checkAppCache passes through the cache, the cache does not change the cookie in the predictable manner. When the request to http://tgt.x.y.checkAppCache is passed through the server, the cookie is changed in the predictable way.

FIG. 1 is a conceptual diagram illustrating conventional navigation to a web application using a hash fragment. In this illustration, the source application 102 requests web browser navigation to a target application at the address "location#fragment" (box 108). If resources are locally cached for the address "location," the web browser may execute the resources and cause the target application to navigate to a state that corresponds to the "fragment" (box 110).

On the other hand, if the resources are not locally cached for the address "location," and if the server system performs one or more redirects, the web browser may "forget" the fragment. Because the server system may not have received the fragment in the request, the web browser 104 eventually launches the target application, but the target application may not navigate to the state that corresponds to the fragment. Accordingly, although the source application requested navigation to a particular state of the target application, the target application may display a default state.

In more detail, source application 102 represents an execution of resources, by a web browser, that correspond to a particular address. For example, the resources may have been retrieved from the application cache 114 or the server system 106 in a request for resources that correspond to an address.

The source application may request navigation to an address that includes a "location" portion and a "fragment" portion (box 108). For example, a user of the source application 102 may select a link that is directed to the address "location#fragment." Similarly, an execution of script instructions that are stored for the source application may request a navigation to or loading of resources for the address "location#fragment."

The address "location#fragment" is intended to illustrate an address that includes a "location" portion and a hash "fragment" portion. The term "location" is used within this document to generically reference multiple portions of an address. For example, an address's "location" may include any combination of an address's protocol, host, subdomain, domain, top-level-domain and path. As used within this document, the term "address" refers to a combination of the location and optionally a hash fragment or query parameter. In other words an "address" may be a full URL.

As explained throughout this document, the fragment portion of an address may be used by a web application to navigate to different states or views of the web application. The set of resources that is used to provide the different states, however, may be obtained in response to a network request for resources corresponding to the address "location." The obtained resources may be stored in a local cache for the address "location." For example, the address www.webemail.com/app#inbox includes a location portion (e.g., "www.webemail.com/app") and a fragment portion (e.g., "inbox").

In response to the web browser 104 receiving the request to navigate to the address "location#fragment," the web browser 104 determines if the resources for the location are cached (box 116). As part of the determination, the web browser can check for the resources in an application cache 114. If the resources are stored in the cache 114, they may be stored at a cache key that includes the "location" portion of the address. The "fragment" portion of the address may be ignored in the cache determination. The application cache 114 may be stored in a same computing device at which the web browser and source application 102 are executing.

If resources are stored in the cache, the web browser may retrieve the resources from the cache and execute the resources (box 110). For example, the web browser may execute the resources, causing the web browser to navigate from the source application to the target application. The navigation may include replacing a display of the source application with the target application, or generating a display for the target application in a new window or browser tab. The target application may also be generated in a frame or portion of the display for the source application.

The target application may use the executing resource to navigate to a state that corresponds to the "fragment." For example, the web browser may have stored the full address "location#fragment" in an address field, but may execute resources that are stored in the cache for the key "location." The target application may access the address field (e.g., the JavaScript code may look at the hash fragment during startup and by periodic on-timer polling of the address field), identify the "fragment" in the address field, and determine that the target application should perform operations to invoke a state that is defined by the "fragment." Accordingly, the target application may execute code in the resources to invoke a state of the target application.

On the other hand, if the web browser 104 receives an indication from the application cache 114 that resources are not stored for the address "location," the web browser 116 may request resources for the address "location" over a network in an HTTP request. The web browser 104 may not include the fragment in the request, as the fragment may be used solely for client-side communication. In some examples, the server system 106 may receive the request and immediately return resources as responsive to the request without any redirects (not illustrated). In these examples, when the web browser 104 launches the target application, the target application may be able to navigate to the appropriate state (e.g., because the address field may still contain the address "location#fragment").

Should the server system 106 request one or more redirects 118, for example as during a login process, the web browser 104 may "forget" the address "location#fragment" as the address may be replaced by one of the redirected addresses. Thus, both the server system and the web browser may not be aware of the "fragment" portion of the originally requested address. Accordingly, when the server system returns resources, the web browser may execute the resources but may not be able to cause the target application to navigate to a state that corresponds to the "fragment" (box 112). In some examples, the resources that are executed are for a different address due to the redirects (e.g., the address "www.webmail.com/logged-in-app").

Figure 2:
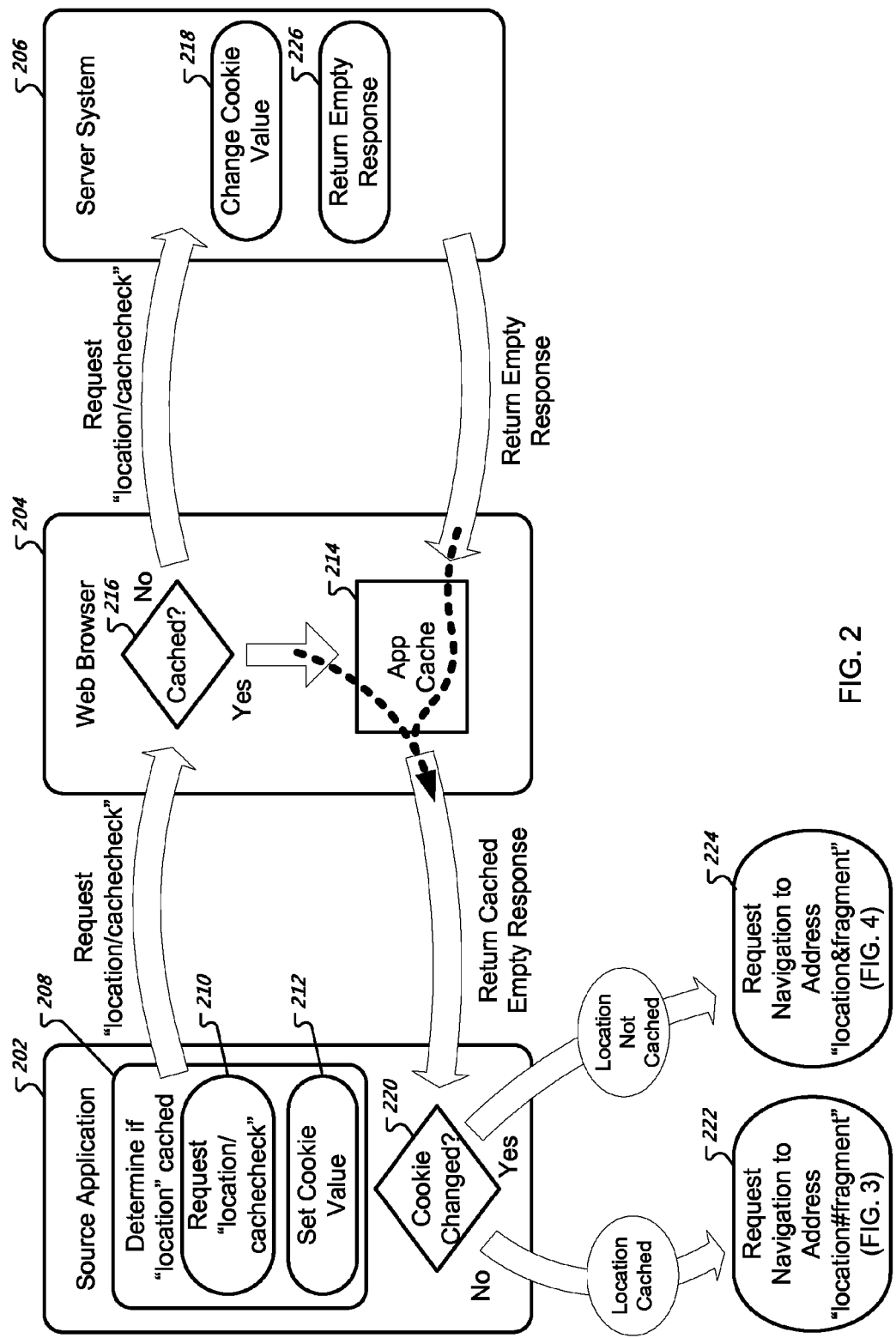
FIG. 2 is a conceptual diagram illustrating a determination whether an application is cached before navigation to the application.

FIG. 2 is a conceptual diagram illustrating a determination whether an application is cached before navigation to the application. In general, the source application 202, before requesting resources for a target application, determines if the target application is cached. The determination may be performed by the source application sending an XHR request to the web browser for resources that would be cached with the target application, (box 208) and checking to see if a cookie has changed after receiving a response to the request (box 220). If the cookie has not changed, the target application may be cached and the navigation to the target application may be requested using an address that includes a "fragment" (box 222). If the cookie has changed, the target application may not be cached and navigation to the target application may be requested using an address that has been modified (e.g., to include the data in the fragment as a parameter) (box 224).

In more detail, the source application 202 may receive an indication that an address "location#fragment" is to be navigated to by the web browser (e.g., a link has been selected by a user or source application JavaScript code requests navigation to the link). Instead of simply requesting that the web browser retrieve resources for the address "location#fragment" (e.g., as illustrated in box 222), the source application first determines if resources for the address "location" are stored in the application cache 214 (box 208).

The determination of whether resources for the address "location" are stored in the application cache 214 (box 208) includes setting a cookie value 212. For example, a cookie for the address "location" may be generated or set to a random value. In some examples, setting the cookie value includes the source application 202 reading the cookie value but not modifying the cookie value.

The determination also includes requesting resources for another address. The other address may be different than the address that is to eventually be navigated to. In various examples the other address is a predetermined extension of the "location" portion of the address. For example, for a particular "location," the address for checking if resources for the address are stored in the application cache 214 may be "location/cachecheck." The request may be an XHR request, so that the response is provided directly to the source application. Thus, resources may be requested for the address "location/cachecheck" in an XHR request. In various examples, one or more resources for the address "location/cachecheck" are specified in a cache manifest for the address "location." Thus, if resources have been requested for the address "location," the cache may also include the "cachecheck" resources.

The request is transmitted to the web browser 204, and the web browser (at box 216) determines if resources are cached for the address "location/cachecheck." For example, the web browser may request that the application cache return resources that are responsive to the request. The application cache 214, however, may return to the web browser an indication that resources are not cached for the address. Thus, the web browser 204 may request the resources over a network.

The server system 206 may receive the request, and in response execute server-side code that is stored for processing the request. Execution of the server-side code may include the server system sending a request that the web browser 204 change a value of the cache checking cookie for the address "location." For example, the server system may request the cookie value from the web browser 204, and in response, issue a request to set the cookie to a new value that is a predetermined modification of the prior value for the cookie.

After changing the cookie value 218, the server system may respond to the request, for example, by sending resources or an empty response (box 226). The resources or empty response may be application cached and returned to the source application 202. As described in more detail below, the source application 202, upon receiving the response, identifies if the cookie value has been changed.

On the other hand, the web browser 204 may determine that the application cache 214 does include resources for the address "location/cachecheck." The browser may not have received a previous request for the address "location/cachecheck," however, the address "location" may be associated with a cache manifest that identifies that the "location/cachecheck" resources are to be stored in the cache with the "location" resources. The web browser 204 and the application cache 214 may return the cached resources for "location/cachecheck." The web browser 204 and the application cache 214, however, may not change the value of the cookie, as may occur when the server receives the request.

Because the request was an XHR request, the web browser 204 may return the empty response and control to the source application program 202. Accordingly, the source application 202 may check the value of the cookie to determine if the cookie has changed (box 220). In some examples, the determination is whether the cookie has changed in a predetermined manner (e.g., if the cookie value has been incremented by one). The determination may be for the predetermined change because the application cache could update the cookie value with an old, cached value for the cookie. A determination that the cookie has not changed indicates that the address "location" has been cached. Conversely, a determination that the cookie has changed indicates that the address "location" has not been cached.

Figure 3:
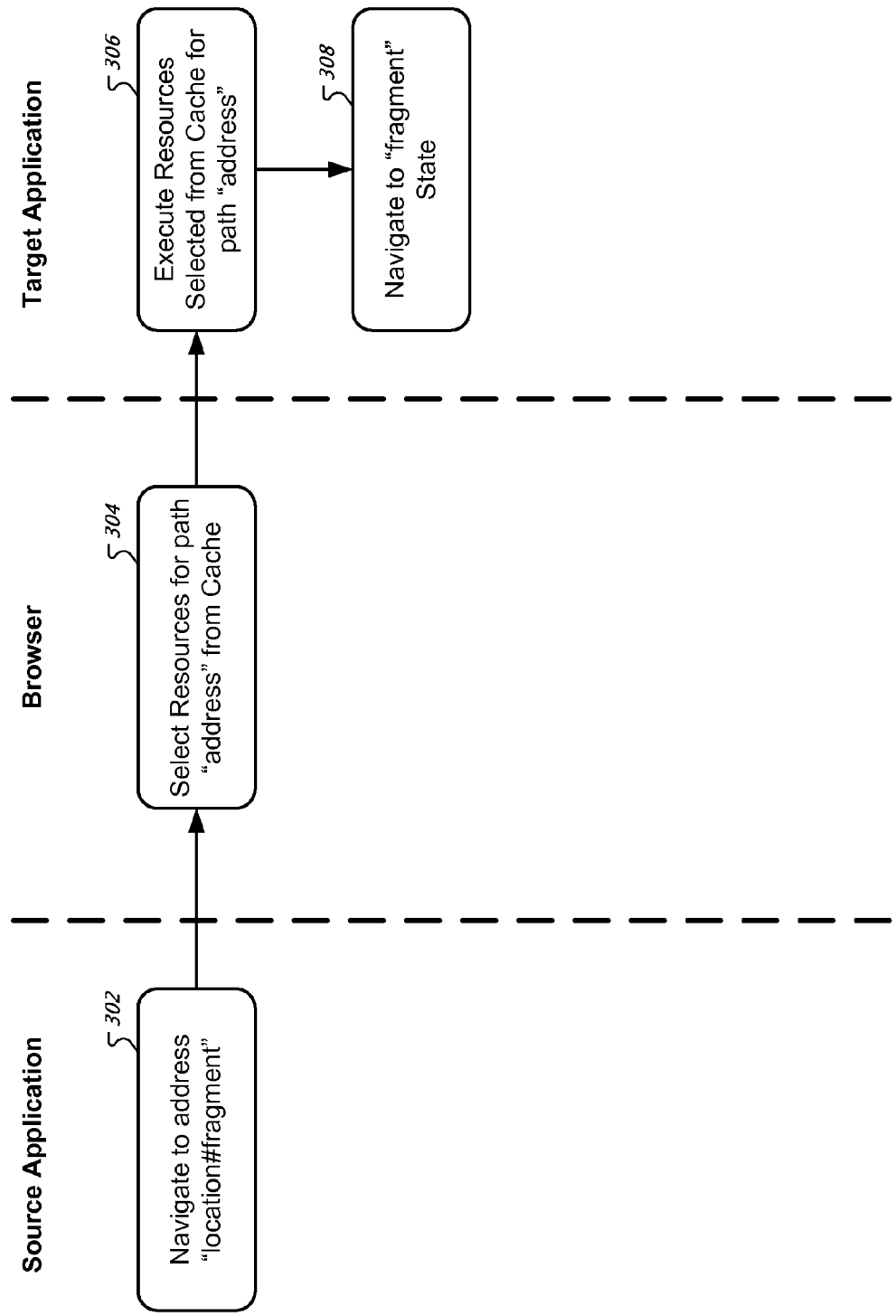
FIG. 3 is a swim lane diagram illustrating navigation to an application that is determined to be cached.
Figure 4:
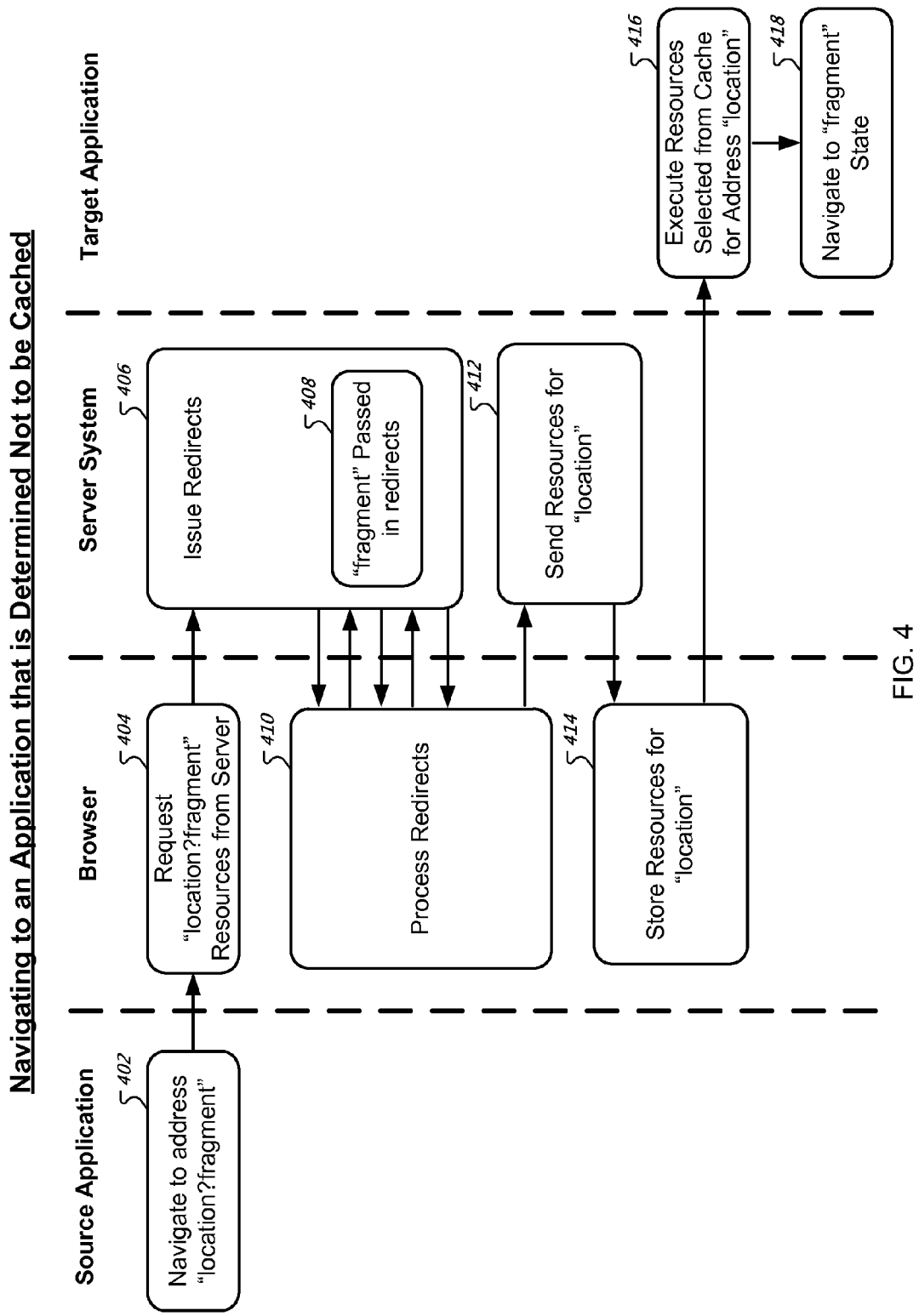
FIG. 4 is a swim lane diagram illustrating navigation to an application that is determined not to be cached.

As described in more detail with respect to FIGS. 3 and 4, if the cookie has not changed, a request for the normal address "location#fragment" is performed (box 222). If the cookie has changed, the address "location#fragment" is modified, for example, to "location?parameter" and the web browser navigates to the modified address (box 224).

FIG. 3 is a swim lane diagram illustrating navigation to an application that is determined to be cached. The process of FIG. 3 may be performed in response to the determination that the cookie value has not changed (at FIG. 2, box 222).

At box 302, the source application requests that the web browser navigate to the address "location#fragment." For example, JavaScript code being executed by source application resources may issue a request to the web browser that the web browser navigate to the "location#fragment" URL. At box 304, the browser receives the request and selects from an application cache the resources that are stored for the key "address." The browser may additionally store the value "location#fragment" in an address field (e.g., a register that stores the current address and that is readable by JavaScript code). At box 306, the browser has executed instructions in the resources, causing the target application to launch. At box 308, the target application may invoke a state that corresponds to the "fragment." For example, the launched target application may identify, from the address field that is stored by the browser, the "fragment." The target application may change a display to correspond to the "fragment."

FIG. 4 is a swim lane diagram illustrating navigation to an application that is determined not to be cached. The process of FIG. 4 may be performed in response to the determination that the cookie value has changed (at FIG. 2, box 224).

At box 402, the source application requests that the browser navigate to the address "location?fragment." As described above, the request is made for an address that has been modified so that content of the "fragment" portion is sent to the web browser within a non-fragment portion of the address. For example, the content of the "fragment" portion may be placed in a query parameter (e.g., the string may be placed after a question mark (?) symbol instead of a hash (#) symbol). In other examples, the fragment portion is placed within other portions of the address (e.g., "location/fragment," "location-fragment," or "location?=fragment"). In various examples, the "parameter" that is used in the modified address is the same as the "fragment." In other examples, the "parameter" that is used is associated with the "fragment," but is not the same. For example, a different string of characters may be used, where the different string of characters causes navigation to a same or similar state of the target application program as the original "fragment."

In box 404, the browser has received the request to navigate to the address "location?fragment" and requests resources from the server system for the address "location?fragment." The browser may first check to see if resources are cached for the address "location?fragment," but this step is not illustrated as the described process has already determined that the application is not cached (see FIG. 2, box 220). In this example, the content in the "fragment" portion of the address is sent to the server system because the content has been included in a query parameter.

In box 406, the server system has received the request to return resources and issues one or more redirects. For example, the server system may determine that the client device hosting the web browser does not include a cookie that indicates that the client device is authenticated to retrieve the resources (e.g., because the user has not provided a username and password to log into the web application). Thus, the server system may request that the browser request resources for a different address.

The different address, however, may include the content of the parameter (box 408). For example, the server system may append the "fragment" and optionally the "location" to the address that the server system is requesting that the browser redirect to. As an illustration, the server system may request that the browser redirect to the address "www.webmail.com/loginpage?fragment," and upon a successful login, redirect to the address "www.webmail.com/loginsuccess?fragment." Thus, the fragment may be appended to an end of the redirect address so that the browser and server system can "remember" the fragment. Accordingly, the browser may process the redirects by requesting resources for the different address that is specified in the redirect request (box 410). The redirects may be to the same server system or a different server system.

The server system may issue a final redirect back to the "location" that serves the set of resources for the target web application. The address of the final redirect may include the original "location#fragment" address. For example, the server may include server-side code that identifies a "parameter" and changes the parameter to a "fragment." Accordingly, the web browser receives the redirect request and subsequently requests resources for the address "location." The resources are received from the server system, and are stored by the web browser in the application cache (box 414).

In other implementations, the target application changes the query parameter to a hash fragment. For example, the target application may identify a current URL, and determines whether the current URL includes text that identifies content that is to be changed to a query fragment (e.g., where the URL may include "location?fragment"). The target application may change the present URL to include the query fragment (e.g., the URL may be changed to "location#fragment").

In box 416, the resources are executed by the browser, causing the target application to launch. In box 418, the target application has polled the address field in the web browser to determined that the address includes a "fragment." Thus, the target application navigates to the state "fragment."

Figure 5:
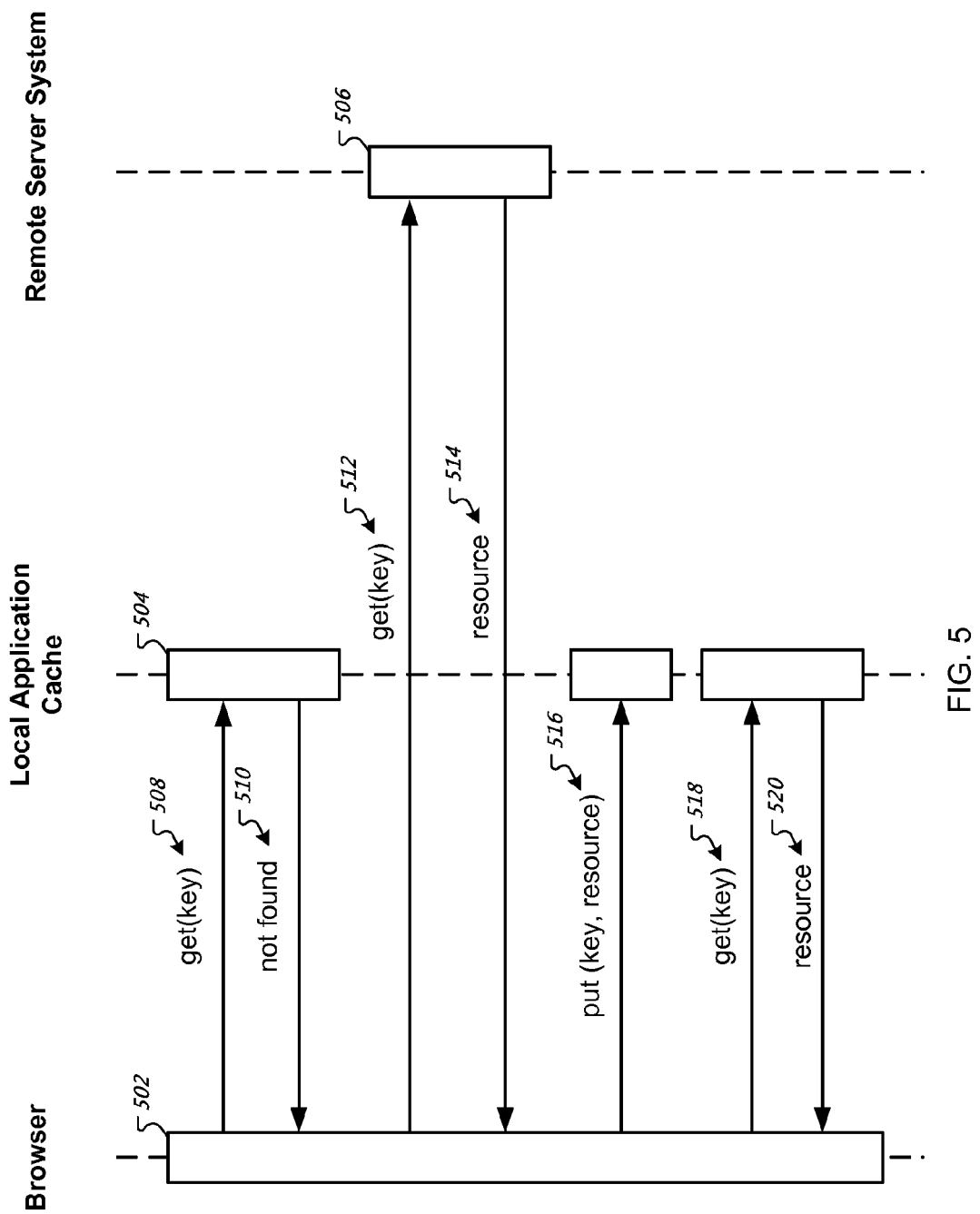
FIG. 5 is a swim lane diagram illustrating a process for utilizing a local application cache in connection with a remote server system.

FIG. 5 is a swim lane diagram illustrating a process for utilizing a local application cache in connection with a remote server system. In this illustration, the browser has received a request to obtain one or more resources corresponding to a URL. The browser 502 first attempts to obtain the resources from a local application cache 504 by issuing a "get" request 508 with the requested URL as the key. The local application cache 504 determines that there are no resources stored for the URL, and returns an indication 510 that there are no resources stored for the key.

The browser 502 next attempts to request the resources over a network from a remote server system 506 by issuing a get request 512 with the URL as the key (e.g., an HTTP request). The remote server system 506 returns the corresponding resource 514. The browser 502 places the resource into the application cache with a "put" command 518 that includes the URL as the key and the resource or a pointer to the resource as the content to be stored in association with the key. At some later point in time, the browser 502 may request the resource from the local application cache 504 with a "get" request 518. In response, the local application cache 504 determines that a resource is stored for the URL key, and returns the resource 520.

Figure 6:
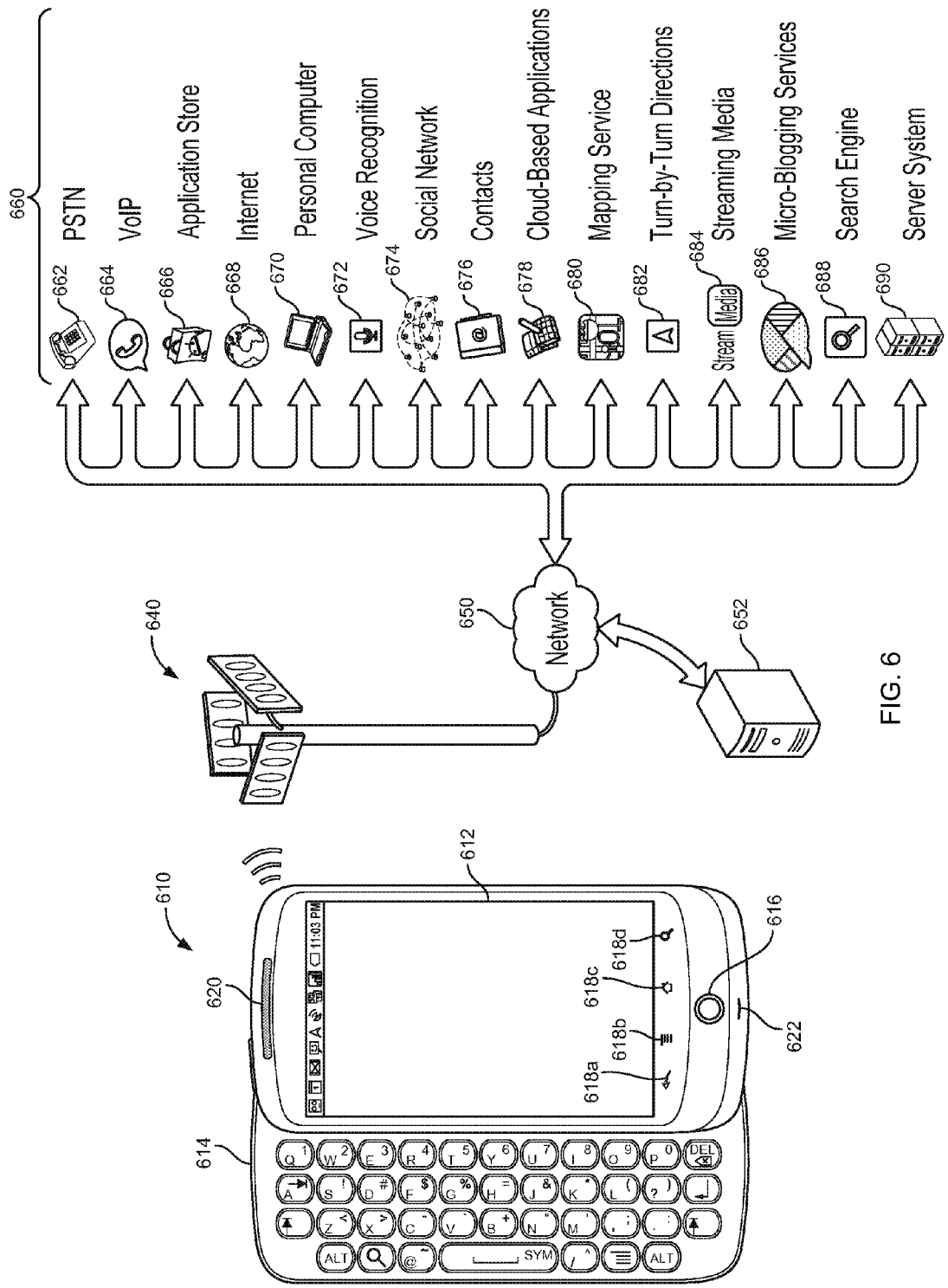
FIG. 6 is a conceptual diagram of a system that may be used to implement the systems and methods described in this document.

Referring now to FIG. 6, a conceptual diagram of a system that may be used to implement the systems and methods described in this document is illustrated. Mobile computing device 610 can wirelessly communicate with base station 640, which can provide the mobile computing device wireless access to numerous services 660 through a network 650.

In this illustration, the mobile computing device 610 is depicted as a handheld mobile telephone (e.g., a smartphone or an application telephone) that includes a touchscreen display device 612 for presenting content to a user of the mobile computing device 610. The mobile computing device 610 includes various input devices (e.g., keyboard 614 and touchscreen display device 612) for receiving user-input that influences the operation of the mobile computing device 610. In further implementations, the mobile computing device 610 may be a laptop computer, a tablet computer, a personal digital assistant, an embedded system (e.g., a car navigation system), a desktop computer, or a computerized workstation.

The mobile computing device 610 may include various visual, auditory, and tactile user-output mechanisms. An example visual output mechanism is display device 612, which can visually display video, graphics, images, and text that combine to provide a visible user interface. For example, the display device 612 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 612). Further, the mobile computing device 610 may include one or more speakers 620 that convert an electrical signal into sound, for example, music, an audible alert, or voice of an individual in a telephone call.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a trackpad enables the user to supply directional and rate of rotation information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618*a-d*. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 6/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" user interface that is displayed upon turning on the mobile computing device 610, activating the mobile computing device 610 from a sleep state, upon "unlocking" the mobile computing device 610, or upon receiving user-selection of the "home" button 618*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 610 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. Unlike an application program, which may not be invoked until a user selects a corresponding icon, a widget's application program may start with the mobile telephone. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 610 may include other application modules and hardware. A call handling unit may receive an indication of an incoming telephone call and provide a user capabilities to answer the incoming telephone call. A media player may allow a user to listen to music or play movies that are stored in local memory of the mobile computing device 610. The mobile telephone 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., Ethernet, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computerized devices that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing devices associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call with a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and PICASA picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network, but may not include the second device receiving the data. Conversely, "receiving" from a first device may include receiving the data from a network, but may not include the first device transmitting the data.

Figure 7:
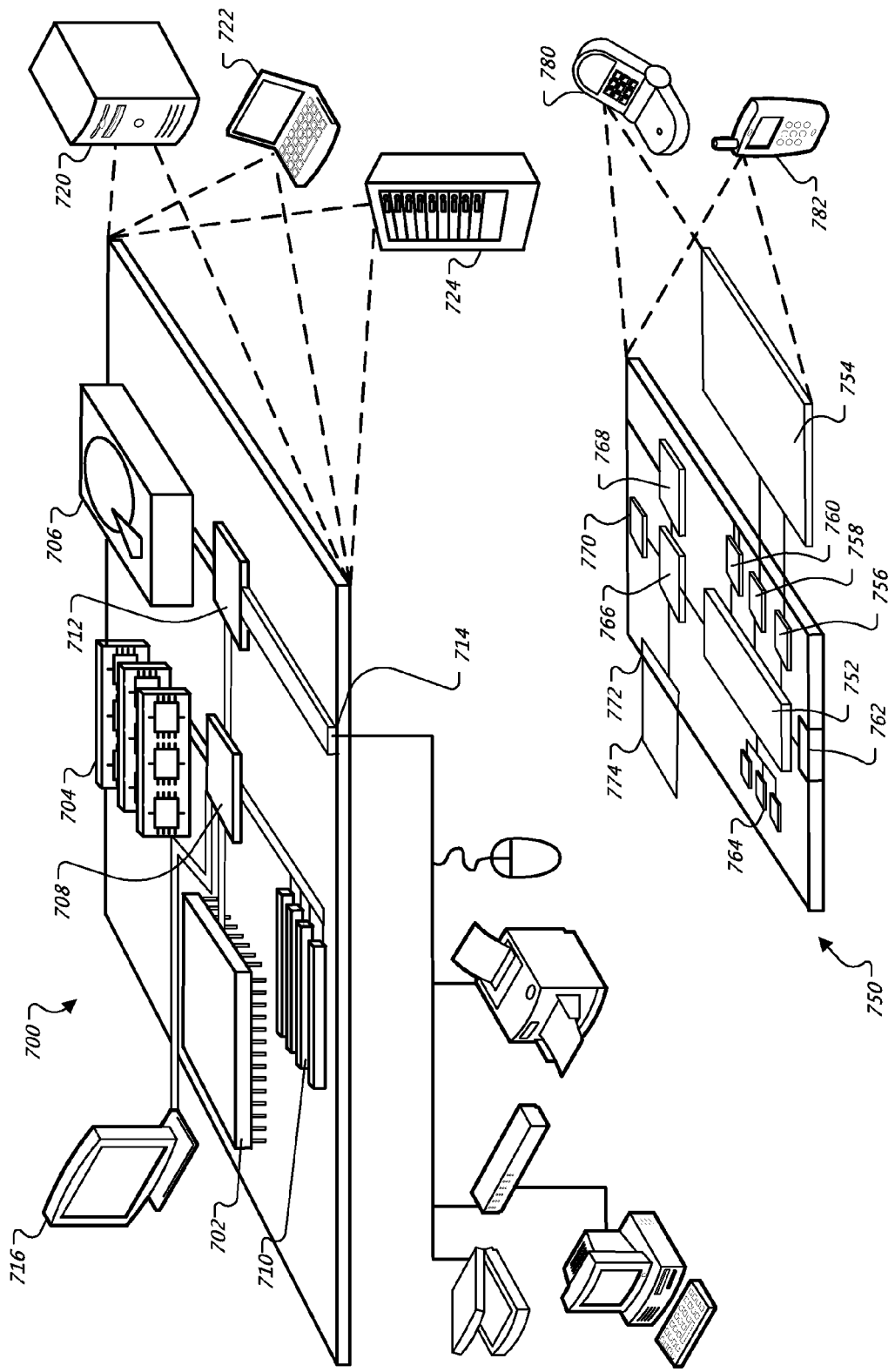
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
    determining, by a source web application that is executed by a web browser that is installed on a computing device, that the web browser is to navigate to a target web application;
    determining, by the source web application, whether resources for the target web application are cached at the computing device; and
    performing actions to request resources for the target web application based on the determination whether resources for the target web application are cached, wherein the actions comprise requesting resources for the target web application using a first address if the target web application is determined to be cached and using a second address if the target web application is determined to not be cached,
        wherein the first address includes a location portion and a fragment portion, and wherein the first address is assembled such that the web browser receiving a request to navigate to the first address is configured to request resources for the first address by transmitting the location portion, but not the fragment portion, over a network and to a server system,
        wherein the second address includes a location portion and a parameter portion, and wherein the second address is assembled such that the web browser receiving a request to navigate to the second address is configured to request resources for the second address by transmitting the location portion and the parameter portion over a network and to a server system,
        wherein a content of the parameter portion comprises a content of the fragment portion.

2. The computer-implemented method of claim 1, wherein determining that the web browser is to navigate to the target web application includes:
    receiving, prior to the determining whether resources are cached, an indication that the web browser is to navigate to the first address; and
    deciding, prior to the determining whether resources are cached, that the first address includes a hash fragment, wherein the determining whether resources are cached is performed in response to deciding that the first address includes a hash fragment, and wherein the web browser is configured to not send the hash fragment in a Hypertext Transfer Protocol (HTTP) request for resources that correspond to the first address.

3. The computer-implemented method of claim 1, wherein determining whether resources for the target web application are cached and performing actions to request resources for the target web application are performed by web browser execution of a scripting language, wherein the scripting language was included in resources that the computing device received from a server system, the resources having been received in response to a request to retrieve resources for an address that corresponds to the source web application.

4. The computer-implemented method of claim 1, wherein determining whether resources for the target web application are cached includes requesting resources for a third address that is different than the first and second addresses.

5. The computer-implemented method of claim 4, wherein determining whether resources for the target web application are cached includes:
    before requesting resources for the third address, setting a value that is stored at the computing device; and
    after receiving a response to the request for resources for the third address, determining whether the value has changed.

6. The computer-implemented method of claim 5, wherein determining whether the value has changed includes determining whether the value has changed in a predetermined manner,
    wherein a determination that the value has changed in the predetermined manner causes a determination that resources for the target web application are not cached, and
    wherein a determination that the value has not changed in the predetermined manner causes a determination that resources for the target web application are cached.

7. The computer-implemented method of claim 6:
    wherein the determination that the value has changed in the predetermined manner indicates to the source web application that a server system (i) received the request for resources for the third address and (ii) changed the value in the predetermined manner, and
    wherein the determination that the value has not changed in the predetermined manner indicates to the source web application: (i) that a cache at the computing device received the request for resources for the third address, (ii) that the cache did not change the value, and (iii) that the web browser did not send a request for resources for the third address over a network and to a server system.

8. The computer-implemented method of claim 1, wherein the first address is assembled to separate the fragment portion from the location portion by a hash (#) symbol.

9. The computer-implemented method of claim 1, wherein the second address is assembled to separate the location portion from the parameter portion by a question mark (?) symbol.

10. The computer-implemented method of claim 1, further comprising accessing, in response to performing actions to request resources for the target web application, resources that are for the target application from a cache at the computing device and that are stored for a cache key that includes the first address location portion, but does not include the first address fragment portion.

11. The computer-implemented method of claim 10, wherein accessing resources that are from the cache causes the web browser to execute the resources and launch the target web application.

12. The computer-implemented method of claim 11, further comprising invoking a state of the target web application that is defined by the first address fragment portion;
wherein determining that the web browser is to navigate to the target application includes determining that the web browser is to navigate to the first address.

13. The computer-implemented method of claim 12, wherein the state of the target web application that is defined by the fragment portion is invoked both (i) in response to a request for resources for the target web application using the first address and by the source application, and (ii) in response to a request for resources for the target web application using the second address and by the source application.

14. A computer-implemented method, comprising:
determining, by a source web application that is executed by a web browser that is installed on a computing device, that the web browser is to navigate to a target web application;
determining, by the source web application, whether resources for the target web application are cached at the computing device;
performing actions to request resources for the target web application based on the determination whether resources for the target web application are cached, wherein the actions comprise requesting resources for the target web application using a first address if the target web application is determined to be cached and using a second address if the target web application is determined to not be cached,
wherein the first address includes a location portion and a fragment portion, and wherein the first address is assembled such that the web browser receiving a request to navigate to the first address is configured to request resources for the first address by transmitting the location portion, but not the fragment portion, over a network and to a server system,
wherein the second address includes a location portion and a parameter portion, and wherein the second address is assembled such that the web browser receiving a request to navigate to the second address is configured to request resources for the second address by transmitting the location portion and the parameter portion over a network and to a server system; and
accessing, in response to performing actions to request resources for the target web application, resources that are for the target application from a cache at the computing device and that are stored for a cache key that includes the first address location portion, but does not include the first address fragment portion.

15. The computer-implemented method of claim 14, wherein accessing resources that are from the cache causes the web browser to execute the resources and launch the target web application.

16. The computer-implemented method of claim 15, further comprising invoking a state of the target web application that is defined by the first address fragment portion;
wherein determining that the web browser is to navigate to the target application includes determining that the web browser is to navigate to the first address.

17. The computer-implemented method of claim 16, wherein the state of the target web application that is defined by the fragment portion is invoked both (i) in response to a request for resources for the target web application using the first address and by the source application, and (ii) in response to a request for resources for the target web application using the second address and by the source application.

18. The computer-implemented method of claim 14, wherein the first address is assembled to separate the fragment portion from the location portion by a hash (#) symbol.

19. The computer-implemented method of claim 14, wherein the second address is assembled to separate the location portion from the parameter portion by a question mark (?) symbol.

20. The computer-implemented method of claim 14, wherein determining that the web browser is to navigate to the target web application includes:
receiving, prior to the determining whether resources are cached, an indication that the web browser is to navigate to the first address; and
deciding, prior to the determining whether resources are cached, that the first address includes a hash fragment, wherein the determining whether resources are cached is performed in response to deciding that the first address includes a hash fragment, and wherein the web browser is configured to not send the query fragment in a Hypertext Transfer Protocol (HTTP) request for resources that correspond to the first address.

21. The computer-implemented method of claim 14, wherein determining whether resources for the target web application are cached and performing actions to request resources for the target web application are performed by web browser execution of a scripting language, wherein the scripting language was included in resources that the computing device received from a server system, the resources having been received in response to a request to retrieve resources for an address that corresponds to the source web application.

22. The computer-implemented method of claim 14, wherein determining whether resources for the target web application are cached includes requesting resources for a third address that is different than the first and second addresses.

23. The computer-implemented method of claim 22, wherein determining whether resources for the target web application are cached includes:
before requesting resources for the third address, setting a value that is stored at the computing device; and
after receiving a response to the request for resources for the third address, determining whether the value has changed.

24. The computer-implemented method of claim 23, wherein determining whether the value has changed includes determining whether the value has changed in a predetermined manner,
wherein a determination that the value has changed in the predetermined manner causes a determination that resources for the target web application are not cached, and
wherein a determination that the value has not changed in the predetermined manner causes a determination that resources for the target web application are cached.

25. The computer-implemented method of claim 24:
wherein the determination that the value has changed in the predetermined manner indicates to the source web application that a server system (i) received the request for resources for the third address and (ii) changed the value in the predetermined manner, and wherein the determination that the value has not changed in the predetermined manner indicates to the source web application: (i) that a cache at the computing device received the request for resources for the third address, (ii) that the cache did not change the value, and (iii) that the web browser did not send a request for resources for the third address over a network and to a server system.

26. A computer-implemented method, comprising:
determining, by a source web application that is executed by a web browser that is installed on a computing device, that the web browser is to navigate to a first address, the first address including a location portion and a fragment portion, wherein the first address is assembled such that the web browser, in response to receiving a request to navigate to the first address, is configured to request resources for the first address by transmitting the location portion, but not the fragment portion, over a network and to a server system;
determining, by the source web application, whether resources for the target web application are cached at the computing device by:
  (i) setting a value that is stored at the computing device,
  (ii) requesting resources for a third address, the third address being different than the first address and a second address, and
  (iii) determining if the value has changed in response to requesting the resources for the third address; and
performing actions to request resources for the target web application based on the determination whether resources for the target web application are cached,
wherein the actions comprise requesting resources for the target web application using the first address if the target web application is determined to be cached, and using the second address if the target web application is determined to not be cached,
wherein the second address includes a location portion and a parameter portion, and wherein the second address is assembled such that the web browser, in response to receiving a request to navigate to the second address, is configured to request resources for the second address by transmitting the location portion and the parameter portion over a network and to a server system.

27. The computer-implemented method of claim 26, wherein a content of the parameter portion comprises a content of the fragment portion.

28. A system for determining if a web application is cached, the system comprising:
an application cache, at a computing device, that is accessible to a web browser, and that stores resources that are keyed to addresses, wherein the resources are loaded into the cache in response to the web browser receiving resources that are responsive to requests over a network, the requests being to retrieve resources for addresses that correspond to the resources;
a source web application program, at the computing device, that is programmed to:
  (i) identify that the web browser is to navigate to a particular address for a target web application,
  (ii) determine whether resources for the target web application are stored in the application cache, wherein the source web application program determines whether the resources for the target web application are stored in the application cache by:
    (a) setting a cookie value at the computing device;
    (b) requesting data for another address; and
    (c) determining if the cookie value has changed in a predetermined manner, and
  (iii) request resources for the target web application using a first address when the target web application is determined to be cached and a second address when the target web application is determined to not be cached.

29. The system of claim 28, wherein the first address includes a location portion and a hash fragment portion, and wherein the second address includes a location portion and a parameter portion, and wherein a content of the parameter portion includes a content of the hash fragment portion.

* * * * *

UNITED STATES PATENT AND TRADEMARK OFFICE
CERTIFICATE OF CORRECTION

| | | |
|---|---|---|
| PATENT NO. | : 8,234,348 B1 | Page 1 of 1 |
| APPLICATION NO. | : 13/251085 | |
| DATED | : July 31, 2012 | |
| INVENTOR(S) | : Ilia Tulchinsky et al. | |

It is certified that error appears in the above-identified patent and that said Letters Patent is hereby corrected as shown below:

On the Title Page, item [56]

Column 2 (Other Publications), line 2, delete "Synax," and insert -- Syntax, -- therefor.

Signed and Sealed this
Ninth Day of October, 2012

David J. Kappos
*Director of the United States Patent and Trademark Office*